United States Patent
Bullock et al.

(10) Patent No.: US 8,360,506 B2
(45) Date of Patent: Jan. 29, 2013

(54) TRAVEL TRAILER

(75) Inventors: Mark Allen Bullock, Elkhart, IN (US); Jeffrey Mark Snyder, White Pigeon, MI (US); Eric John Johanson, Granger, IN (US)

(73) Assignee: Thor Tech, Inc., Jackson Center, OH (US)

(*) Notice: Subject to any disclaimer, the term of this patent is extended or adjusted under 35 U.S.C. 154(b) by 77 days.

(21) Appl. No.: 12/952,535

(22) Filed: Nov. 23, 2010

(65) Prior Publication Data

US 2012/0126571 A1    May 24, 2012

(51) Int. Cl.
*B60P 7/02* (2006.01)
*B60P 3/335* (2006.01)

(52) U.S. Cl. .............. 296/168; 296/100.06; 296/182.1

(58) Field of Classification Search .............. 296/24.3, 296/37.1, 156, 165, 168–173, 181.1, 181.2, 296/181.3, 181.5, 182.1
See application file for complete search history.

(56) References Cited

U.S. PATENT DOCUMENTS

| | | | |
|---|---|---|---|
| 3,078,117 A | 2/1963 | Martini | |
| 3,245,224 A | 4/1966 | Wilkinson | |
| 3,425,740 A | 2/1969 | De Vaughn | |
| 3,753,543 A | 8/1973 | Burrell et al. | |
| 3,767,292 A | 10/1973 | Rutkowski | |
| 4,332,040 A | 6/1982 | Palmer | |
| 6,276,736 B1 | 8/2001 | Cook et al. | |
| 6,293,220 B1 * | 9/2001 | Halsall | 114/353 |
| 7,000,978 B1 | 2/2006 | Messano | |
| 2004/0201247 A1 | 10/2004 | Gehman et al. | |
| 2005/0280272 A1 | 12/2005 | Vokey et al. | |

OTHER PUBLICATIONS

KZ Inferno SST Travel Trailer Brochure, published Oct. 1, 2008, accessed at http://kz-rv.com/brochures_2009/KZ09_InfernoSST_Broch.pdf on May 1, 2012.*
Prowler by Fleetwood Brochure, 1997 model year, photocopy received from primary examiner's collection of printed prior art.*

* cited by examiner

*Primary Examiner* — Glenn Dayoan
*Assistant Examiner* — Jason S Daniels
(74) *Attorney, Agent, or Firm* — Dinsmore & Shohl LLP

(57) ABSTRACT

A travel trailer has a trailer body, including a front cap. The cap defines a recess in the front portion thereof. A recess cover is pivotally secured to said front cap for covering said recess. The cover is movable between a closed position, in which said recess is covered, and an open position, in which said recess is accessible. One or more liquid propane tanks are provided in the recess. The liquid propane tanks are covered when the recess cover is in the closed position and accessible when said recess cover is in the open position.

17 Claims, 9 Drawing Sheets

TRAVEL TRAILER

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Travel trailers have become increasingly popular and increasingly more sophisticated in construction and in the amenities that they provide. It is common for travel trailers to be heated, and to have a full range of kitchen appliances. While some appliances, such as microwave ovens, may be electrically powered, and therefore usable only when the electrical system of the trailer is connected to an external electrical power source, such as by plugging the electrical system of the trailer into an electrical outlet at a campsite, or powered by an on-board motor-generator set, a number of the appliances provided in travel trailers are typically powered by propane gas. In fact, it is common to use propane devices for cooking, heating, lighting, water heating and refrigeration on travel trailers. By utilizing propane, the appliances can be used whether or not external electrical power is available, and some appliances, such as a refrigerator, can be used even during towing.

Propane gas is stored in liquid form in one or more containers carried on the trailer. On motor homes and fifth wheel trailers, the liquid propane tanks are typically carried in compartments in the vehicle body, with access to the compartments from the exterior of the vehicle being provided by doors or removable panels. Liquid propane tanks on travel trailers have typically been mounted on the front of the trailer frame, in front of the trailer body. Such tanks have been covered, if at all, by fabric covers or molded fiberglass or plastic covers that fit over the tops of the tanks. Mounting the tanks on the front of the travel trailer, exposed to view, is unsightly, and is not aerodynamically efficient. It is seen that there is a need for an improved storage arrangement for liquid propane tanks on travel trailers.

SUMMARY

A travel trailer has a trailer body, a recess cover, and one or more liquid propane tanks. The trailer body includes a front cap. The cap defines a recess in the front portion thereof. The recess cover is pivotally secured to the front cap for covering the recess. The cover is movable between a closed position, in which the recess is covered, and an open position, in which the recess is accessible. The one or more liquid propane tanks are positioned in the recess, and are covered when the recess cover is in the closed position and accessible when the recess cover is in the open position.

The travel trailer includes a pair of latches mounted on the recess cover and the front cap, for securing the recess cover in the closed position. The pair of latches are positioned to either side of the recess cover. The recess cover defines a central recessed portion that allows it to avoid contacting a hitch jack when the recess cover is moved into its open position.

The travel trailer includes a pair of cover hinges, securing the recess cover to the front cap adjacent the bottom of the recess cover. This allows the recess cover to pivot forward and permits access to the propane tanks at the top of the recess. Each of the pair of hinges has a threaded shaft extending from the cap through the recess cover and a hinge knob secured to the threaded shaft.

A travel trailer has a frame, a trailer body, a recess cover, one or more liquid propane tanks, and a latch mechanism. The trailer body includes a front cap that is mounted on the frame. The front cap defines a recess in the front portion thereof above the frame. The recess cover is pivotally secured to the front cap to cover the recess. The cover is movable between a closed position, in which the recess is covered, and an open position, in which the recess is accessible. The one or more liquid propane tanks in the recess are mounted on the frame. The one or more liquid propane tanks are covered when the recess cover is in the closed position and accessible when the recess cover is in the open position. The latch mechanism is mounted on the recess cover and the front cap, and is capable of securing the recess cover in the closed position. The latch mechanism may comprise a pair of latches positioned to either side of the recess cover. The recess cover may define a central recessed portion which permits the recess cover to be moved into its open position without interference with a hitch jack secured to the frame, forward of the cap. The travel trailer may also include a pair of cover hinges that secure the recess cover to the front cap adjacent the bottom of the recess cover, thereby permitting the recess cover to pivot forward and permit access to the propane tanks at the top of the recess. Each of the pair of hinges may comprise a threaded shaft extending from the cap through the recess cover and having a hinge knob secured to the threaded shaft.

A travel trailer includes a trailer frame, and a trailer body supported by the trailer frame. The trailer body includes a front cap at the forward end of the trailer body. The cap defines a recess in the front portion of the cap. The recess is sized to receive a pair of liquid propane tanks. The recess is open at the bottom such that the pair of liquid propane tanks may be mounted on the frame. A recess cover is pivotally secured to the front cap adjacent the lower edge of the recess cover. The recess cover is pivotable outward from a closed position to an open position. The liquid propane tanks are accessible when the recess cover is in the open position.

A pair of latches may be mounted on the recess cover and the front cap, for securing the recess cover in the closed position. The pair of latches may be positioned to either side of the recess cover. The recess cover defines a central recessed portion to avoid contacting a hitch jack when the recess cover is moved into its open position. The travel trailer further includes a pair of cover hinges, securing the recess cover to the front cap adjacent the bottom of the recess cover, thereby permitting the recess cover to pivot forward and permit access to the propane tanks at the top of the recess. Each of the pair of hinges may comprise a threaded shaft extending from the cap through the recess cover and having a hinge knob secured to the threaded shaft.

DETAILED DESCRIPTION

Figure 5:
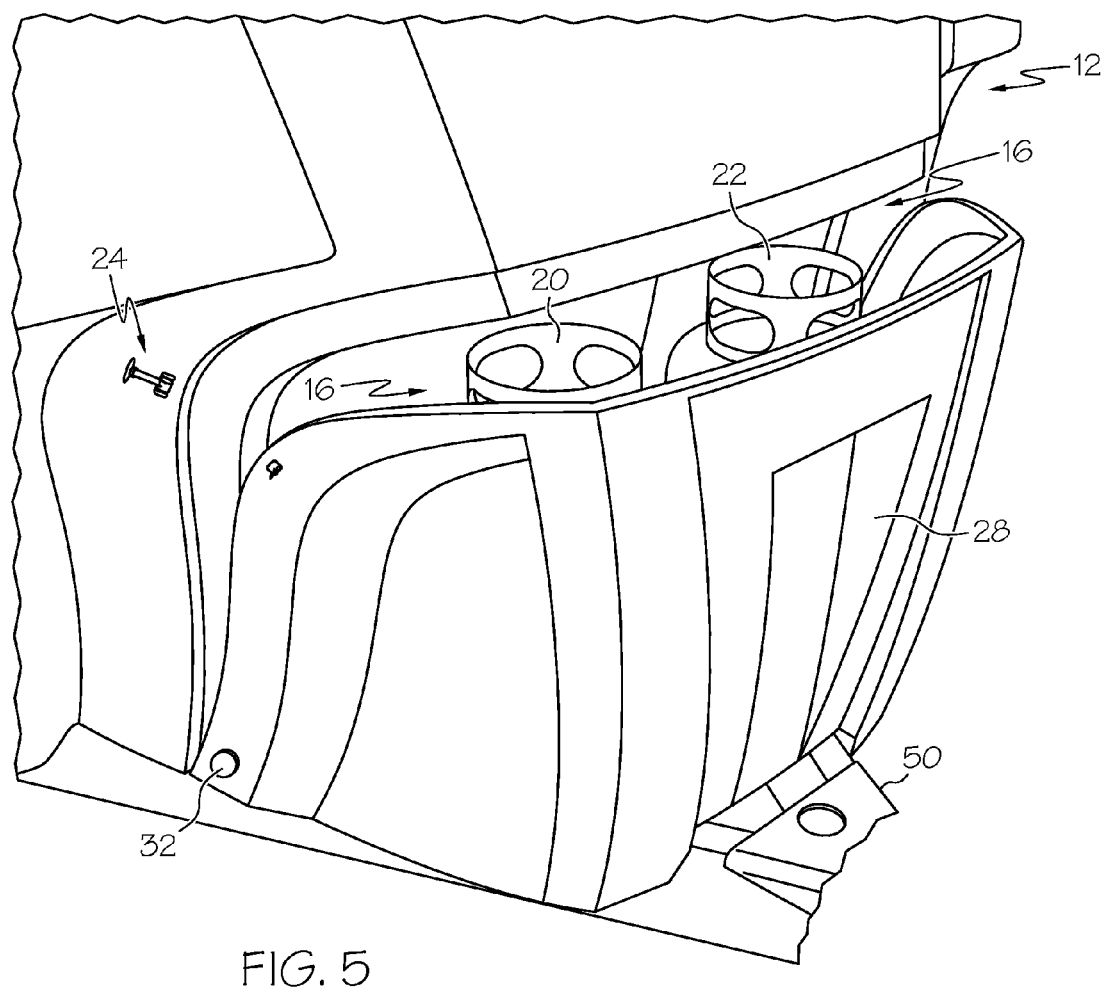
FIG. 5 is a view, similar to FIG. 4, showing the recess cover in an open position.
Figure 6:
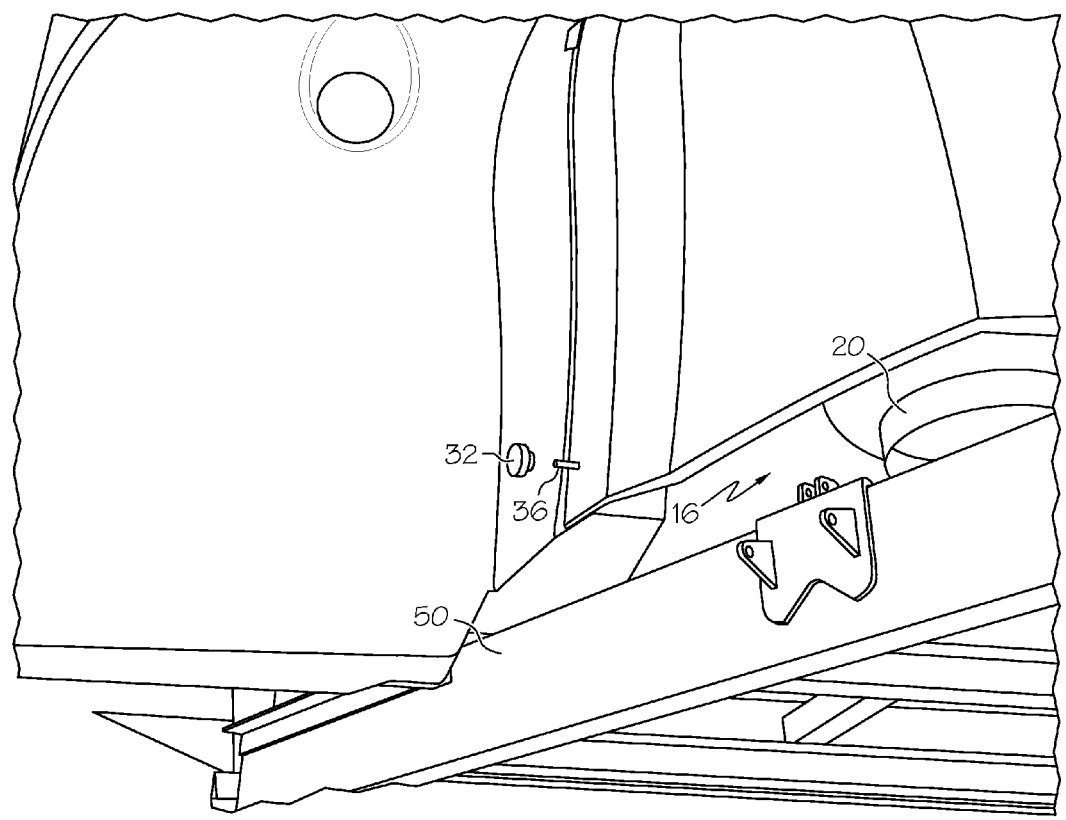
FIG. 6 is an enlarged view of the bottom of the recess cover, showing an embodiment of the hinge arrangement that permits the recess cover to be pivoted forward.
Figure 7:
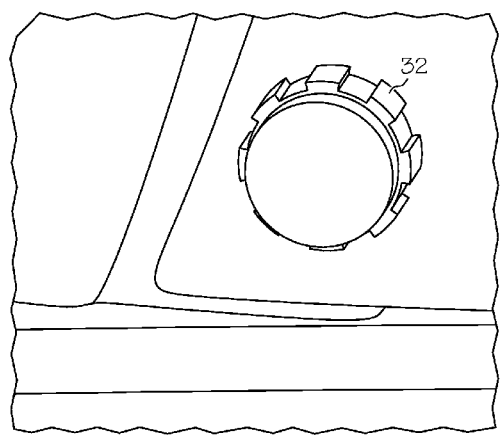
FIG. 7 is an enlarged view of the bottom of the recess cover, showing the knob that forms a part of the hinge.

Reference is made to FIGS. 1-6 which show a travel trailer 10 having a trailer body 12 including a front cap 14, which may be molded of fiberglass or similar molded composite material. As shown in FIG. 5, the front cap 12 defines a recess 16 in the front, central portion of the cap 12. A recess cover 18, also made of a fiberglass or other molded composite material, is pivotally secured to the front cap 12. The recess cover 18 covers the recess 16, and is movable between a closed position, shown for example in FIGS. 1-3, in which the recess 16 is covered, and an open position, shown for example in FIG. 5, in which the recess 16 is accessible. One or more liquid propane tanks 20 and 22 are mounted in the recess 16. The one or more liquid propane tanks 20 and 22 are covered when the recess cover 18 is in the closed position and accessible when the recess cover 18 is in the open position. As can be seen in FIG. 6, the recess 16 is open at the bottom, having no floor and not being fully enclosed, even when the recess 16 is covered by recess cover 18 in the closed position.

Figure 1:
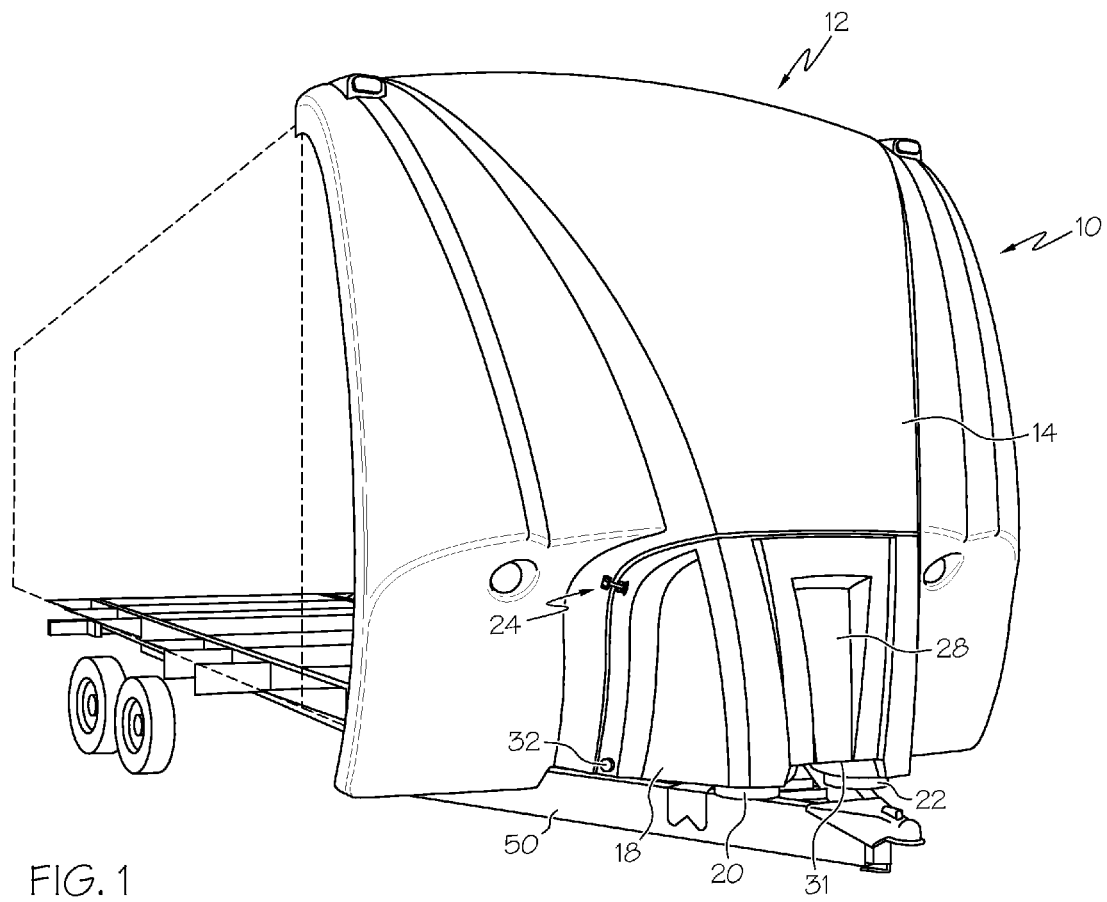
FIG. 1 is a perspective view of the travel trailer, as seen generally from the front of the trailer looking rearward, with the side walls of the trailer body shown in dashed lines to reveal the trailer frame.
Figure 2:
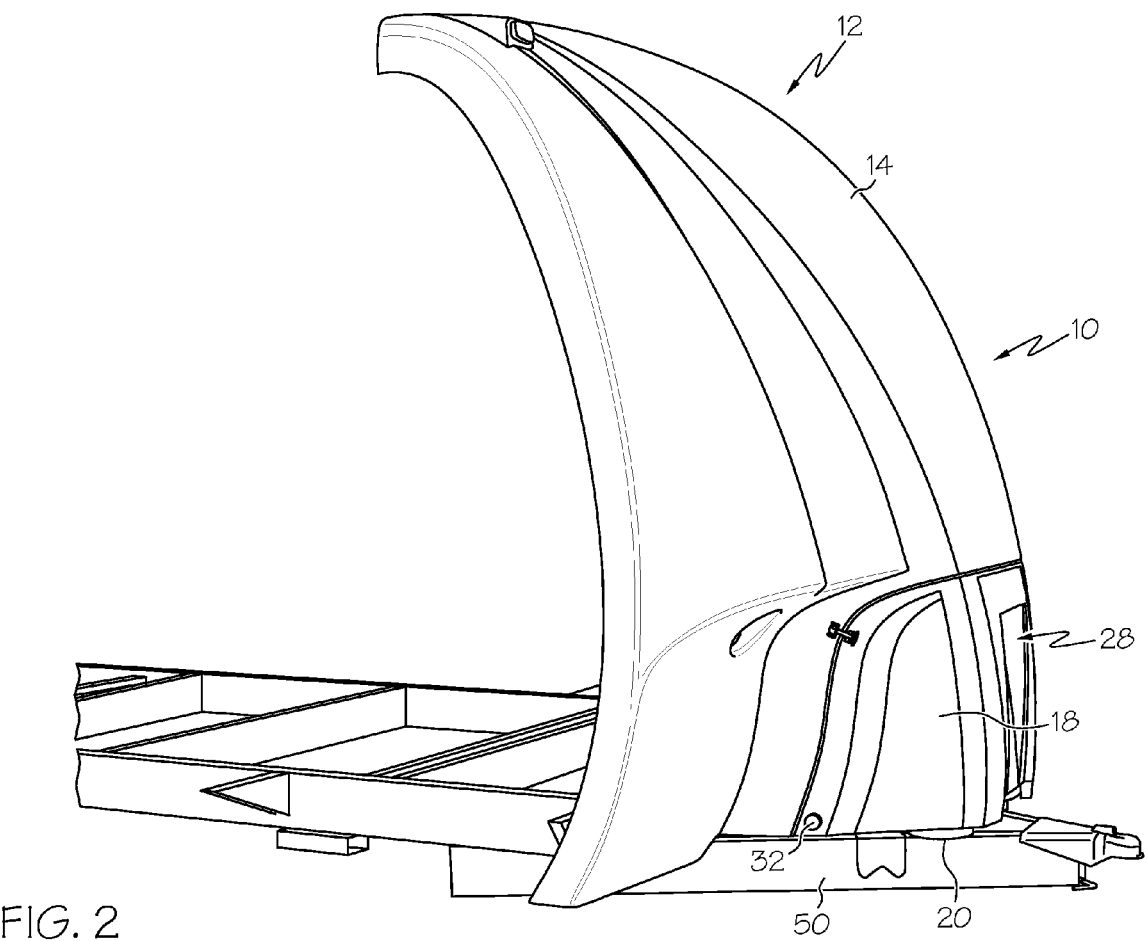
FIG. 2 is a side view of the front of the trailer body cap and frame.
Figure 3:
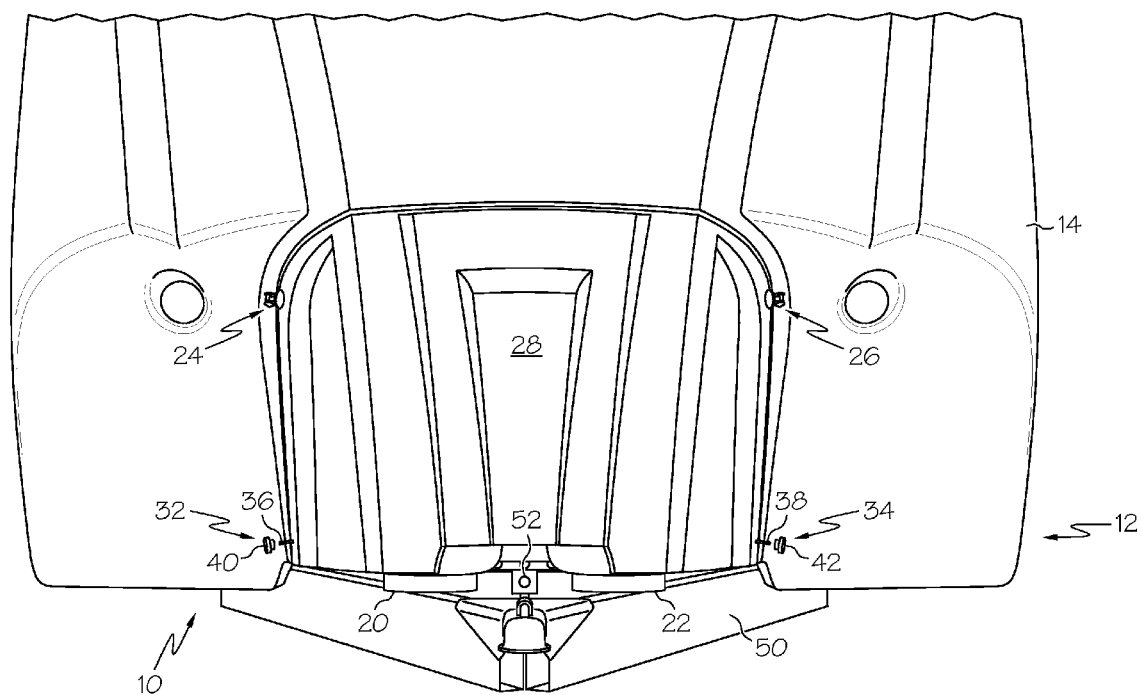
FIG. 3 is a front view of the trailer.
Figure 4:
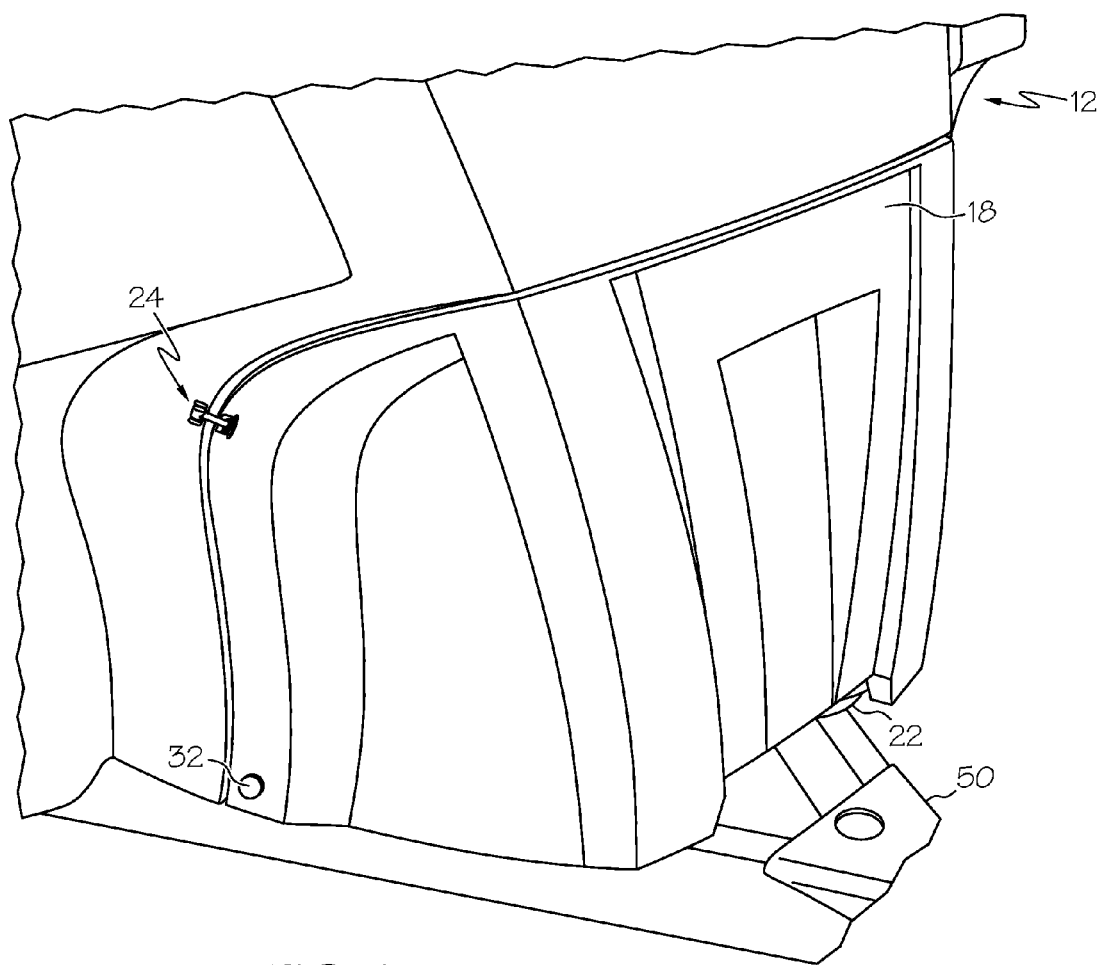
FIG. 4 is a view of a portion of the trailer body cap, and the recess cover in a closed position.
Figure 8:
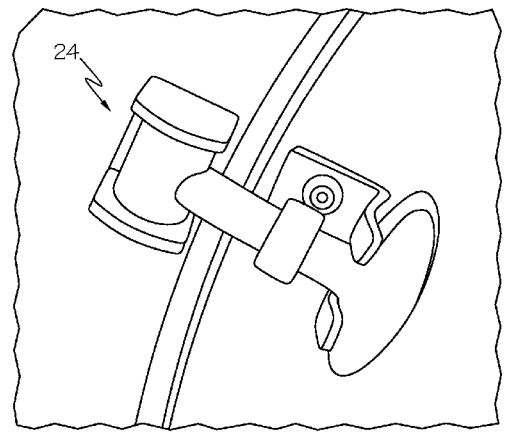
FIG. 8 is an enlarged view of the side of the recess cover, showing a latch.

The travel trailer further includes a pair of latches 24 and 26, mounted on the recess cover 18 and the front cap 14, for securing the recess cover 18 in the closed position. As best seen in FIG. 3, and FIG. 8, the pair of latches 24 and 26 are positioned to either side of the recess cover 18. The pair of latches 24 and 26 together comprise a latch mechanism which holds the recess cover in its closed position. In some constructions, a single, centrally located latch may be substituted for the two latches.

Figure 9:
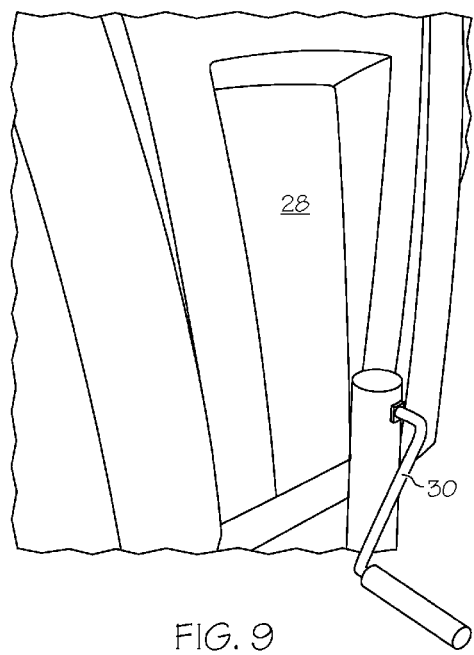
FIG. 9 is view showing the recess cover and a hitch jack.
Figure 10:
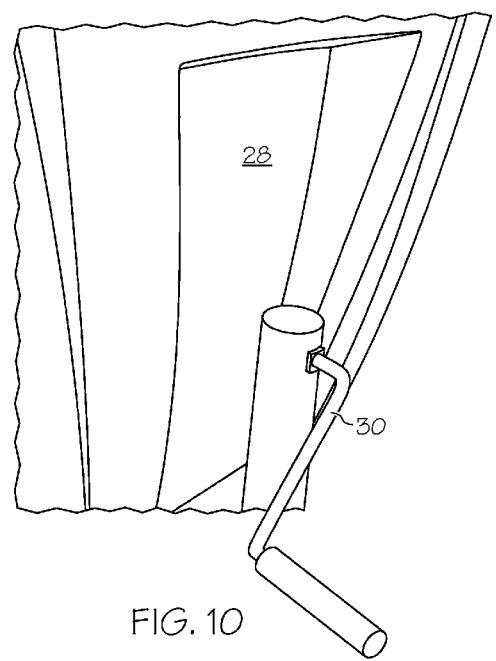
FIG. 10 is a view, similar to FIG. 9, showing the recess cover moved forward into the open position and the hitch jack received into the central recessed portion of the recess cover.
Figure 11:
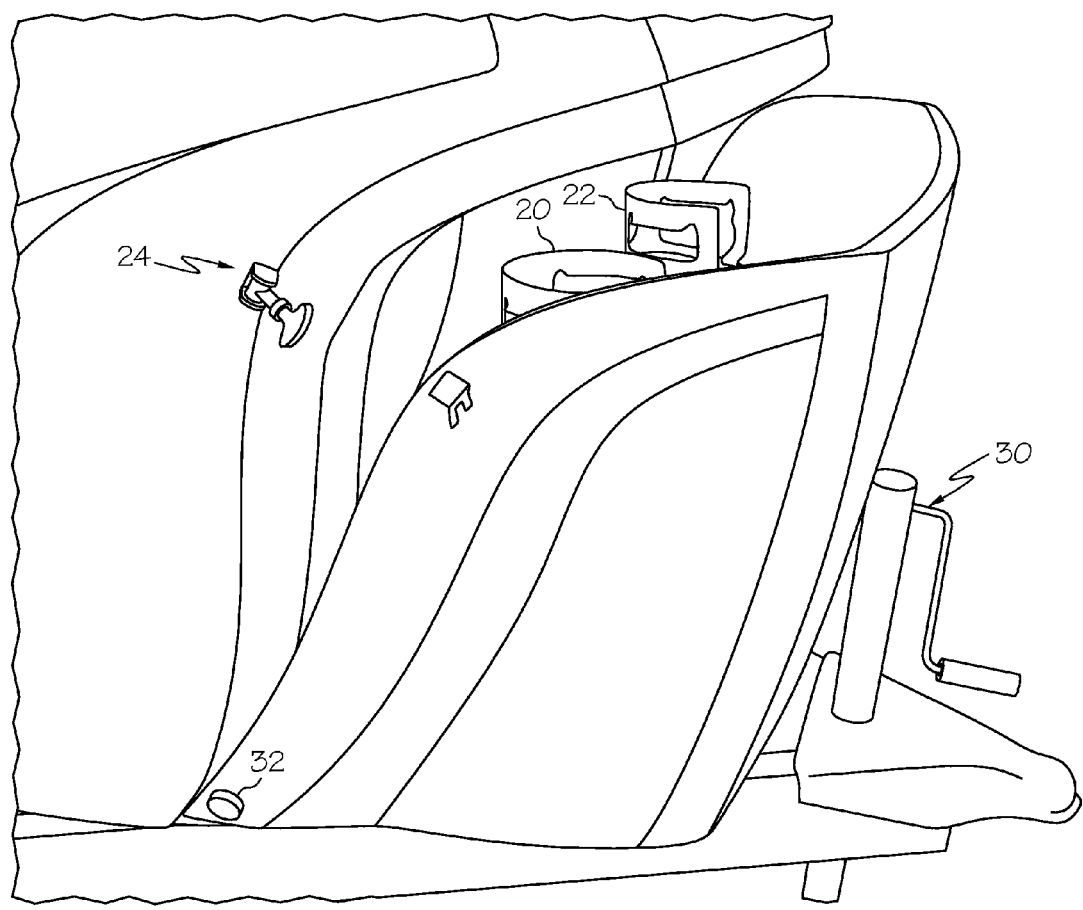
FIG. 11 is a view showing the recess cover moved forward to allow access to the tops of the liquid propane tanks.

The recess cover 18 itself defines a central recess portion 28 which permits the recess cover 18 to move into its open position without contacting a hitch jack 30 (shown in FIGS. 9-11) when the recess cover 18 is moved into its open position. The range of movement of the cover 18 may be limited by contact between the lower edge of the cover 18 and frame 50. Accordingly, a notch 31 is provided in the lower edge of the cover 18 to increase the range of movement of the cover 18.

As seen in FIGS. 1-7 and 11, a pair of cover hinges 32 and 34 secure the recess cover 18 to the front cap 14 adjacent the bottom of the recess cover. The hinges 32 and 34 permit the recess cover 18 to pivot forward and allow access to the propane tanks 20 and 22 at the top of the recess 16. In the illustrated embodiment, each of the pair of hinges 32 and 34 comprises a threaded shaft, 36 and 38, respectively, extending from the cap 14 through an opening in the recess cover 18 and having a hinge knob 40 and 42, respectively, secured to the threaded shaft. The shafts 36 and 38 have flat bases which may be adhesively secured to cap 14. It will be appreciated, however, that other, alternative hinge arrangements may be used for securing the recess cover 18 to the front cap 14 adjacent the bottom of the recess cover. For example, an R-clip spring cotter pin may be used in conjunction with a shaft having an end opening to secure each side of the cover adjacent its lower edge.

As seen in FIGS. 1, 2, 3, 4, and 6, the liquid propane tanks 20 and 22 in recess 16 may be mounted on the frame 50 which also supports the trailer body 12. The propane tanks are secured to a frame 50 by means of a tray (not shown). The tray captures the lower flanges of tanks 20 and 22 and is screwed into the drawbars of the frame 50. A bracket 52 allows for a bulkhead fitting connection between the liquid propane supply pipe under the frame 50 going to appliances in the travel trailer 10 and the propane regulator associated with the tanks. The tops of the liquid propane tanks 20 and 22 are covered when the recess cover is in the closed position and accessible when the recess cover is in the open position. This permits the trailer occupant to access the tank valves which are positioned on the tops of the tanks. These valves are connected to hoses that run from the tanks to the propane regulator. The valves and the regulator provide for manual or automatic switching between the two tanks. The pivotable recess cover 28 provides a clean, aerodynamic appearance when in the closed position. As will be noted in FIG. 3, the knobs 40 and 42 can be unscrewed from threaded shafts 36 and 38, and the recess cover removed from the front of the cap 12. This permits the liquid propane tanks 20 and 22 to be removed for refilling or replacement.

What is claimed is:

1. A travel trailer, comprising:
   a trailer body, including a front cap, said cap defining a recess in the front portion thereof,
   a trailer frame beneath said trailer body, supporting said trailer body and extending forward of said front cap,
   a recess cover, pivotally secured to said front cap for covering said recess, said cover movable between a closed position, in which said recess is covered, and an open position, in which said recess is accessible, said recess cover having a notched bottom edge to permit pivoting said cover into the open position without interference with the trailer frame, and
   one or more liquid propane tanks in said recess, said one or more liquid propane tanks being covered when said recess cover is in said closed position and accessible when said recess cover is in said open position.

2. The travel trailer of claim 1, further comprising a pair of latches mounted on said recess cover and said front cap, for securing said recess cover in said closed position.

3. The travel trailer of claim 2, in which said pair of latches are positioned to either side of said recess cover.

4. The travel trailer of claim 1, in which said recess cover defines a central recessed portion to avoid contacting a hitch jack when the recess cover is moved into its open position.

5. The travel trailer of claim 1, further comprising a pair of cover hinges, securing said recess cover to said front cap adjacent the bottom of said recess cover, thereby permitting said recess cover to pivot forward and permit access to said propane tanks at the top of said recess.

6. The travel trailer of claim 5, in which each of said pair of hinges comprises a threaded shaft extending from said cap through said recess cover and having a hinge knob secured to said threaded shaft.

7. A travel trailer, comprising:
   a frame,
   a trailer body, including a front cap, mounted on said frame, said front cap defining a recess in the front portion thereof above said frame, a recess cover, pivotally secured to said front cap for covering said recess, said cover movable between a closed position, in which said recess is covered, and an open position, in which said recess is accessible, said cover having a notched bottom edge to permit pivoting said cover into the open position without interference with the trailer frame, one or more liquid propane tanks in said recess mounted on said frame, said one or more liquid propane tanks being covered when said recess cover is in said closed position and accessible when said recess cover is in said open position, and a latch mechanism mounted on said recess cover and said front cap, for securing said recess cover in said closed position.

8. The travel trailer of claim 7, in which said latch mechanism comprises a pair of latches positioned to either side of said recess cover.

9. The travel trailer of claim 7, in which said recess cover defines a central recessed portion which permits said recess cover to be moved into its open position without interference with a hitch jack secured to said frame, forward of said cap.

10. The travel trailer of claim 8, further comprising a pair of cover hinges, securing said recess cover to said front cap adjacent the bottom of said recess cover, thereby permitting said recess cover to pivot forward and permit access to said propane tanks at the top of said recess.

11. The travel trailer of claim 10, in which each of said pair of hinges comprises a threaded shaft extending from said cap through said recess cover and having a hinge knob secured to said threaded shaft.

12. A travel trailer, comprising:

a trailer frame, a trailer body, supported by said trailer frame, said trailer body including a front cap at the forward end of said trailer body, said cap defining a recess in the front portion of the cap, the recess being sized to receive a pair of liquid propane tanks, and said recess being open at the bottom such that said pair of liquid propane tanks may be mounted on said frame, a recess cover, pivotally secured to said front cap adjacent the lower edge of said recess cover, said recess cover pivotable outward from a closed position to an open position, said liquid propane tanks being accessible when said recess cover is in said open position, said recess cover having a notched bottom edge to permit pivoting said cover into the open position without interference with the trailer frame.

13. The travel trailer of claim 12, further comprising a pair of latches mounted on said recess cover and said front cap, for securing said recess cover in said closed position.

14. The travel trailer of claim 13, in which said pair of latches are positioned to either side of said recess cover.

15. The travel trailer of claim 12, in which said recess cover defines a central recessed portion to avoid contacting a hitch jack when the recess cover is moved into its open position.

16. The travel trailer of claim 12, further comprising a pair of cover hinges, securing said recess cover to said front cap adjacent the bottom of said recess cover, thereby permitting said recess cover to pivot forward and permit access to said propane tanks at the top of said recess.

17. The travel trailer of claim 16, in which each of said pair of hinges comprises a threaded shaft extending from said cap through said recess cover and having a hinge knob secured to said threaded shaft.

* * * * *